United States Patent [19]
Oh

[11] Patent Number: 5,633,936
[45] Date of Patent: May 27, 1997

[54] METHOD AND APPARATUS FOR DETECTING A NEAR-END SPEECH SIGNAL

[75] Inventor: Stephen S. Oh, Richardson, Tex.

[73] Assignee: Texas Instruments Incorporated, Dallas, Tex.

[21] Appl. No.: 369,956

[22] Filed: Jan. 9, 1995

[51] Int. Cl.$^6$ .................................................. H04B 3/20
[52] U.S. Cl. ............................. 381/66; 381/94; 379/410; 379/411; 379/406
[58] Field of Search ........................ 381/66, 94, 57, 381/107; 379/406, 407, 408, 410, 411, 388, 389, 390, 392

[56] References Cited

U.S. PATENT DOCUMENTS

| | | | |
|---|---|---|---|
| 4,979,163 | 12/1990 | Erving et al. | 379/388 |
| 5,463,618 | 10/1995 | Furukawa et al. | 379/410 |
| 5,473,702 | 12/1995 | Yoshida et al. | 381/71 |
| 5,483,594 | 1/1996 | Prado et al. | 379/406 |

*Primary Examiner*—Curtis Kuntz
*Assistant Examiner*—Duc Nguyen
*Attorney, Agent, or Firm*—Carlton H. Hoel; W. James Brady, III; Richard L. Donaldson

[57] ABSTRACT

An acoustic echo canceler (10) includes an adaptive filter circuit (12) and a near-end speech detection circuit (14). The adaptive filter circuit (12) includes an adaptive filter that may be of a single or dual filter structure for generating an e(t) acoustic echo canceler output signal (26) in response to an s(t) far-end speech signal (20) and an x(t) send-in signal (28). The near-end detection circuit (14) receives the s(t) far-end speech signal (20) and the x(t) send-in signal (28) at a high pass filter (32) and a high pass filter (36), respectively. The filtered s(t) far-end speech signal (20) and the filtered x(t) send-in signal (28) are averaged over a selected sampling period by a far-end sampling circuit (34) and a send-in sampling circuit (38). A divider circuit (40) generates a γ(t) acoustic echo path gain/loss signal (42) in response to the filtered and averaged s̄(t) far-end speech signal (20) and x̄(t) send-in signal (28). A near-end detector (44) compares the γ(t) acoustic echo path gain/loss signal (42) with a $ρ_γ$ long term average signal (46) generated from the γ(t) acoustic echo path gain/loss signal (42) to determine a first condition for near-end speech detection. Near-end detector (44) also compares an ē(t) average power signal (51) of the e(t) acoustic echo canceler output signal (26) as generated by a power sampling circuit (50) with its $ρ_e$ long term average signal (53) generated by a long term echo canceler averaging circuit (52) as a second condition.

18 Claims, 3 Drawing Sheets

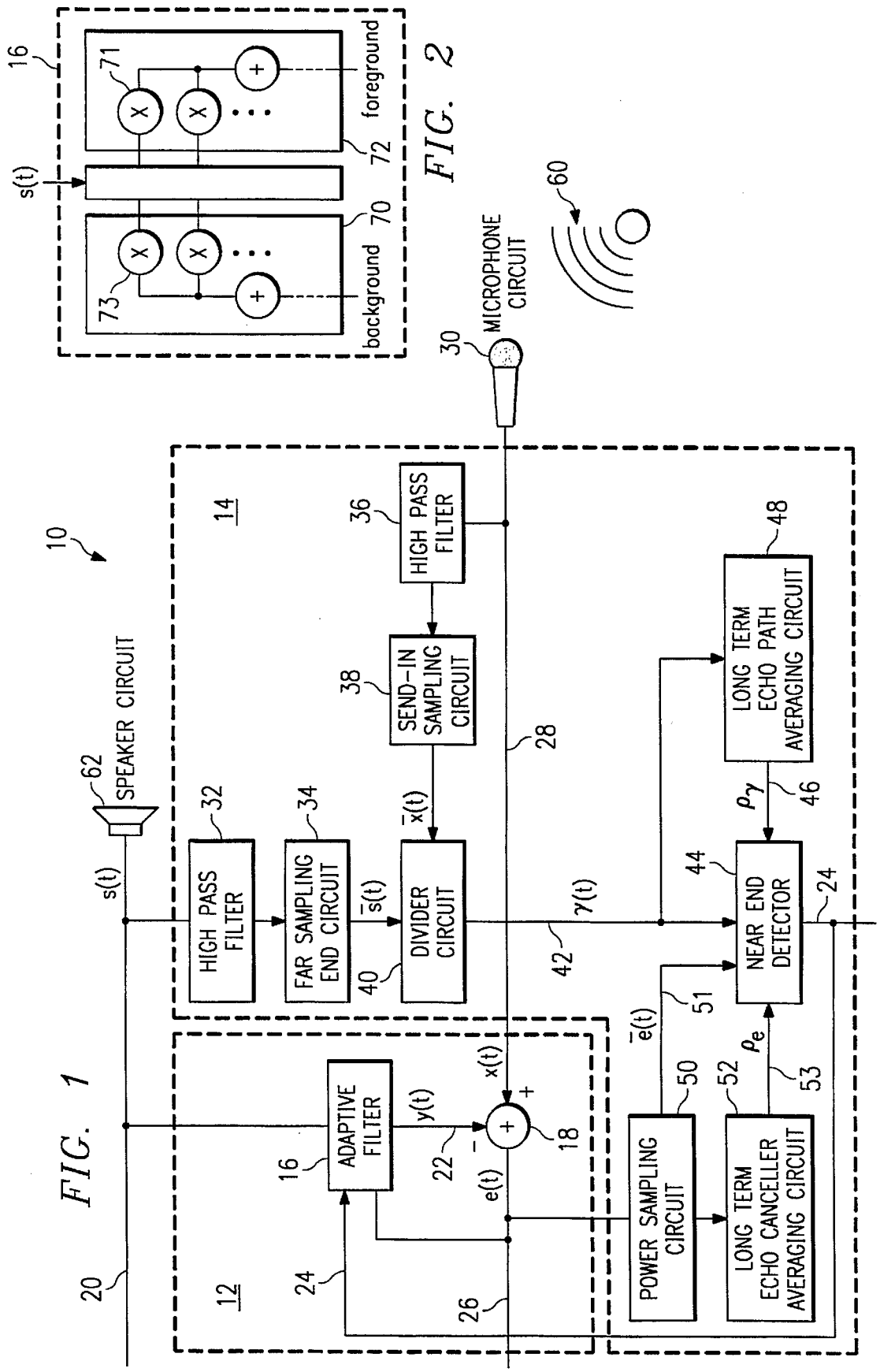

METHOD AND APPARATUS FOR DETECTING A NEAR-END SPEECH SIGNAL

TECHNICAL FIELD OF THE INVENTION

The present invention relates in general to telecommunication signal processing and more particularly to a method and apparatus for detecting a near-end speech signal.

BACKGROUND OF THE INVENTION

An acoustic echo canceler is one of the most desirable capabilities in a hands free telephone environment. The acoustic echo canceler prevents a speaker from hearing one's own voice during a phone conversation. The speech signal of a far-end speaker travels through a communication channel, a loud speaker, ambient air, a microphone, and through the communication channel back to the far-end speaker. In such a situation the far-end speaker can hear one's own voice returned with some delay, causing a distraction during phone conversations. The acoustic echo canceler cancels the far-end speech signal before the telephone system sends out the signal to the far-end speaker. Therefore, the purpose of the acoustic echo canceler is to cancel the far-end speech so that the far-end speech does not travel back to the far-end speaker. However, the acoustic echo canceler should not cancel or distort the near-end talker's speech when it exists. The near-end speech detection logic circuit is one of the critical components of the acoustic echo canceler. Conventional acoustic echo cancelers use near-end speech detection circuits that do not operate well in low signal to noise ratio environments, such as car phone applications during vehicle operation. Therefore, it is desirable to have an acoustic echo canceler with near-end speech detection that performs well in low signal to noise ratio environments.

SUMMARY OF THE INVENTION

From the foregoing, it may be appreciated that a need has arisen for an acoustic echo canceler with near-end speech detection that operates in low signal to noise ratio environments. A need has also arisen for an echo canceler with near-end speech detection that operates regardless of the surrounding noise environment.

In accordance with the present invention, a method and apparatus for detecting a near-end speech signal are provided that substantially eliminate or reduce disadvantages and problems associated with conventional acoustic echo canceler devices.

According to an embodiment of the present invention, there is provided a method of detecting a near-end speech signal that includes determining an average power of an acoustic echo canceler output signal over a selected sampling period in response to a received send-in signal from a microphone and an adaptive filter output signal of an adaptive filter. The adaptive filter output signal is generated by a far-end speech signal that is filtered as well as the received send-in signal. An average of the filtered far-end speech signal and an average of the filtered received send-in signal are determined over the selected sampling period. An acoustic echo path gain/loss is determined by taking a ratio of the average filtered received send-in signal and the average filtered far-end speech signal. A long term power average is determined for the acoustic echo canceler output signal and is compared to the average power of the acoustic echo canceler output signal. A long term average of the acoustic echo path gain/loss is determined and compared against the acoustic echo path gain/loss in order to detect a presence of the near-end speech signal.

The present invention provides various technical advantages over conventional acoustic echo canceler devices. For example, one technical advantage is in detecting the near-end speech signal regardless of the operating environment. Another technical advantage is in delineating near-end speech from environmental noise. Other technical advantages are readily apparent to one skilled in the art from the following figures, descriptions, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which:

FIG. 1 illustrates a block diagram of an acoustic echo canceler with a near-end speech detection circuit;

FIG. 2 illustrates a block diagram of a dual structure for an adaptive filter within the acoustic echo canceler;

DETAILED DESCRIPTION OF THE INVENTION

Figure 3:
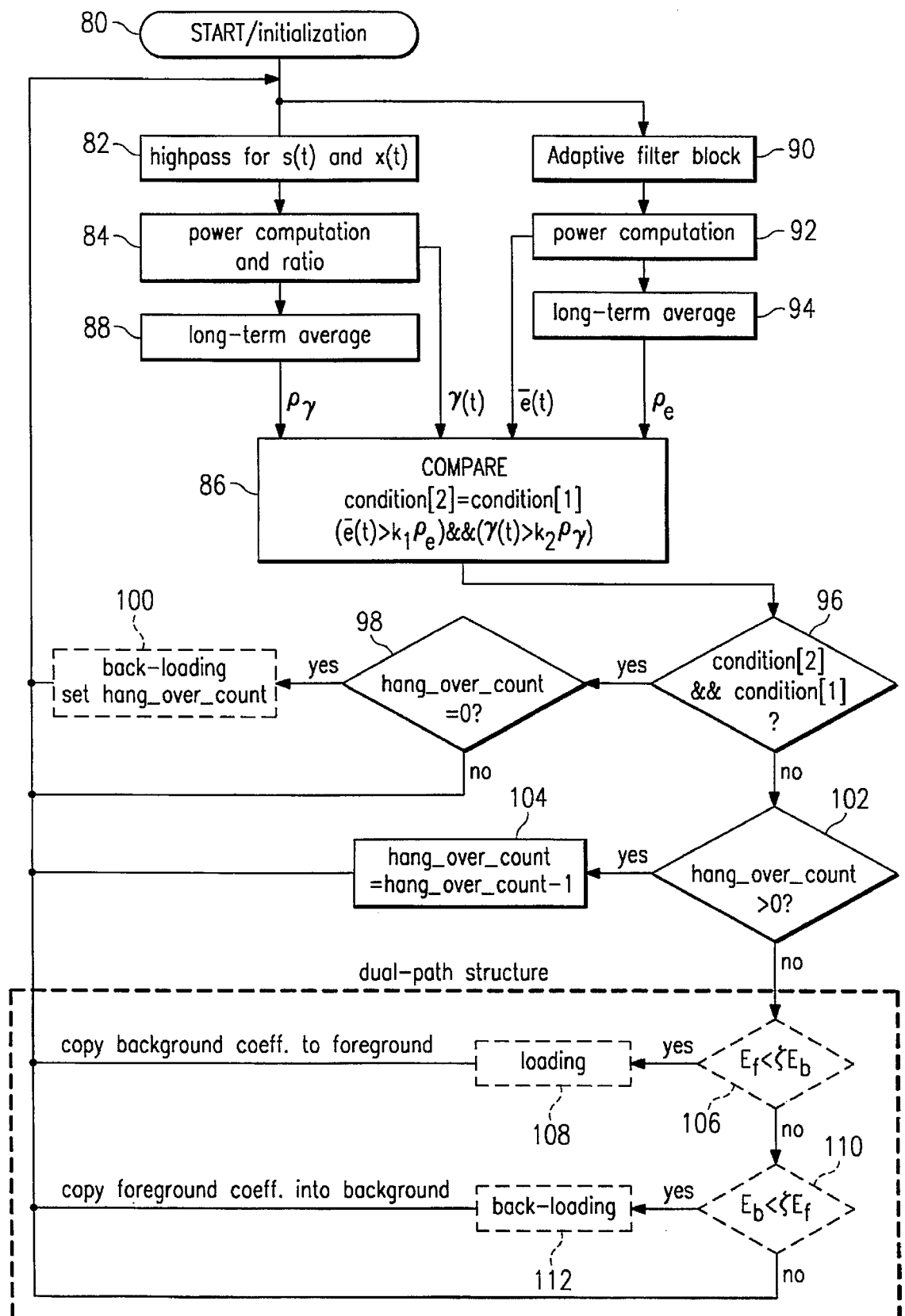
FIG. 3 illustrates a block diagram of the process steps for detecting a near-end speech signal.

FIG. 1 is a block diagram of an acoustic echo canceler 10. Acoustic echo canceler 10 includes an adaptive filter circuit 12 and a near-end speech detection circuit 14. Adaptive filter circuit 12 includes an adaptive filter 16 and a summing circuit 18. Adaptive filter 16 receives an s(t) far-end speech signal 20 and generates a y(t) response signal 22 in response to a near-end detection signal 24 from near-end detection circuit 14. Adaptive filter circuit 12 generates an e(t) acoustic echo canceler output signal 26 by combining y(t) response signal 22 with an x(t) send-in signal 28 received from a microphone circuit 30. The e(t) acoustic echo canceler output signal 26 is transmitted back to the far-end speaker. Adaptive filter circuit 12 cancels the far-end speech within x(t) send-in signal 28 in order to prevent the far-end speaker from hearing one's own voice. The relationships of x(t), y(t), s(t), and e(t) are shown by the following equations.

$$x(t) = \sum_{k=1}^{M} h(k)s(t-k) + n(t) \qquad (1)$$

where h(k) is echo path impulse response, s(t−k) is the far-end speech signal, and n(t) is the noise component.

$$y(t) = \sum_{k=1}^{M} b(k)s(t-k) \qquad (2)$$

where b(k) represents the coefficients of adaptive filter 16 and is an estimate of the echo path impulse response.

$$e(t) = x(t) - y(t) \qquad (3)$$

Near-end detection circuit 14 includes a high pass filter 32 that filters s(t) far-end speech signal 20. Filtered s(t) far-end speech signal 20 is then processed within a far-end sampling circuit 34 that determines an average of the filtered s(t)

far-end speech signal 20. Similarly, near-end speech detection circuit 14 includes a filter 36 that filters x(t) send-in signal 28 received from microphone circuit 30. Filtered x(t) send-in signal 28 is then processed by a send-in sampling circuit 38 that determines an average of filtered x(t) send-in signal 28. The sampling period used for far-end sampling circuit 34 is the same as the sampling period used for send-in sampling circuit 36. After filtering and averaging have been performed, s(t) far-end speech signal 20 and x(t) send-in signal 28 are combined in a divider circuit 40 that generates a γ(t) acoustic echo path gain/loss signal 42. A near-end detector 44 receives γ(t) acoustic echo path gain/loss signal 42 and a $\rho_\gamma$ long term average signal 46 of γ(t) acoustic echo path gain/loss signal 42 through a long term echo path averaging circuit 48.

Near-end speech detection circuit 14 also receives e(t) acoustic echo canceler output signal 26 at a power sampling circuit 50 that determines an $\bar{e}(t)$ average power signal 51 of e(t) acoustic echo canceler output signal 26. Power sampling circuit 50 has the same sampling period as the other sampling circuits within near-end detection circuit 14. Near-end detector 44 receives the $\bar{e}(t)$ average power signal 51 and a $\rho_e$ long term power average signal 53 of e(t) acoustic echo canceler output signal 26 through a long term echo canceler averaging circuit 52. Near-end detector 44 detects the presence of near-end speech in response to γ(t) acoustic echo path gain/loss signal 42, $\rho_\gamma$ long term average signal 46, $\bar{e}(t)$ average power signal 51, and $\rho_e$ long term power average signal 53 in order to generate near-end detection signal 24 for driving adaptive filter 16 of adaptive filter circuit 12.

In operation, a far-end speaker transmits s(t) far-end speech signal 20 that is heard by a near-end speaker 60 over a speaker 62. The x(t) send-in signal 28 is a combination of far-end speech, noise, and near-end speech picked up by microphone circuit 30. The noise characteristic of x(t) send-in signal 28 has significant low frequency components. In automobile applications, the noise components below 1.5 kHz are about 20 dB stronger than those above 1.5 kHz during highway driving conditions. Therefore, x(t) send-in signal 28 is fed through a high pass filter 36 to eliminate that portion of x(t) send-in signal 28 that is below 1.5 kHz in order to eliminate much of the noise component. The s(t) far-end speech signal 20 passes through high pass filter 32 in order to eliminate components below 1.5 kHz in order to be consistent with the filtering of x(t) send-in signal 28. Once the low frequency components have been filtered out, s(t) far-end speech signal 20 and x(t) send-in signal 28 are averaged over a selected sampling period by far-end sampling circuit 34 and send-in sampling circuit 38 respectively. The following equations show the requirements for averaging s(t) far-end speech signal 20 and x(t) send-in signal 28.

$$\bar{s}(t) = (1-\alpha)\bar{s}(t-M) + \alpha \left[ \frac{1}{M} \sum_{k=1}^{M} |HPF[s(t-k)]|^P \right] \quad (4)$$

$$\bar{x}(t) = (1-\alpha)\bar{x}(t-M) + \alpha \left[ \frac{1}{M} \sum_{k=1}^{M} |HPF[x(t-k)]|^P \right] \quad (5)$$

where

α is a selected constant,

M is the sampling period,

HPF is a high pass filter operation,

P is a p-norm function, $\bar{x}(t-m)$ is a previous sampling period value, and $\bar{s}(t-m)$ is a previous sampling period value.

After averaging, divider circuit 40 generates a γ(t) acoustic echo path gain/loss signal 42 that is the ratio of the averaged filtered x(t) send-in signal 28 over the averaged filtered s(t) far-end speech signal 20. Long term echo path averaging circuit 48 generates a $\rho_\gamma$ long term average signal 46 of the γ(t) acoustic echo path gain/loss signal 42. The $\rho_\gamma$ long term average signal 46 is updated whenever there is no near-end speech present as determined by near-end detector 44. Near-end detector 44 compares the γ(t) acoustic echo path gain/loss signal 42 with $\rho_\gamma$ long term average signal 46 in order to determine the presence of near-end speech. The following equations represent the γ(t) acoustic echo path gain/loss signal 42, the $\rho_\gamma$ long term average signal 46 and their comparison for near-end speech detection.

$$\gamma(t) = \frac{\bar{x}(t)}{\bar{s}(t)} \quad (6)$$

$$\rho_\gamma = (1-\mu)\rho_\gamma + \mu\gamma(t) \quad \text{if no near-end speech} \quad (7)$$
$$= \rho_\gamma \quad \text{otherwise}$$

where μ<<1.

$$\gamma(t) > k_2 \rho_\gamma \quad (8)$$

representing the first condition, where $k_2$ is a constant greater than 1.

Near-end speech detection may also be achieved by performing a power comparison of e(t) acoustic echo canceler output signal 26. Power sampling circuit 50 receives e(t) acoustic echo canceler output signal 26 and generates an $\bar{e}(t)$ average power signal 51 of e(t) acoustic echo canceler output signal 26. Long term echo canceler averaging circuit 52 generates a $\rho_e$ long term power average signal 53 of $\bar{e}(t)$ average power signal 51. The $\rho_e$ long term power average signal 53 is updated whenever there is no near-end speech present as determined by near-end detector 44. Near-end detector 44 compares $\bar{e}(t)$ average power signal 51 to $\rho_e$ long term power average signal 53 in order to determine the presence of near-end speech. The following equations represent the $\bar{e}(t)$ average power signal 51, the $\rho_e$ long term power average signal 53, and their comparison for near-end speech detection.

$$\bar{e}(t) = (1-\alpha)\bar{e}(t-M) + \alpha \left[ \frac{1}{M} \sum_{k=1}^{M} |e(t-k)|^P \right] \quad (9)$$

where

α is a constant,

M is the sampling period,

P is the p-norm function, and is the previous sampling period value.

$$\rho_e = (1-\mu)\rho_e + \mu\bar{e}(t) \quad \text{if no near-end speech} \quad (10)$$
$$= \rho_e \quad \text{otherwise}$$

where μ<<1.

$$\bar{e}(t) > k_1 \rho_e \quad (11)$$

representing the second condition, where $k_1$ is a constant greater than 1.

Though the presence of near-end speech may be detected through this simple power comparison, near-end detector 44 checks to see if two conditions are satisfied that indicate the presence of near-end speech. The first condition that must be satisfied is that γ(t) acoustic echo path gain/loss signal 42 must be greater than a selected multiple of $\rho_\gamma$ long term average signal 46. The second condition that must be satisfied is that the $\bar{e}(t)$ average power signal 51 must be greater than a selected multiple of $\rho_e$ long term power average signal 53. When these two conditions are met, near-end detector 44 generates an indication signal 24 that provides an indication of the presence of near-end speech.

Though adaptive filter 16 has been shown as a single path structure of one adaptive filter, a dual path structure using two filters may also be used. FIG. 2 shows a dual path structure for adaptive filter 16. The dual path structure of adaptive filter 16 contains two filters, a background filter 70 and a foreground filter 72. For the dual path structure, foreground filter 72 is an adaptive filter and loads its foreground coefficients 71 to background filter 70 once in a frame period if the power estimate $E_f(t)$ of the foreground signal is less than the power estimate $E_b(t)$ of the background signal. The background filter is an adaptive filter and loads its background coefficients 73 to foreground filter 72 if the power estimate $E_b(t)$ of the background signal is less than the power estimate $E_f(t)$ of the foreground signal. The background coefficients 73 of background filter 70 are also loaded to foreground filter 72 upon the detection of near-end speech. The following equations show the power estimates for the foreground and background filters of a dual structure adaptive filter.

$$E_f(t) = (1-\alpha)E_f(t-M) + \alpha\left[\frac{1}{M}\sum_{k=1}^{M}|e_f(t-k)|^P\right] \quad (12)$$

$$E_b(t) = (1-\gamma)E_b(t-M) + \gamma\left[\frac{1}{M}\sum_{k=1}^{M}|e_b(t-k)|^P\right] \quad (13)$$

where

α is a constant, $E_f(t-m)$ is a previous sampling period value, $E_b(t-m)$ is a previous sampling period value, M is the sampling period, P is the p-norm function, $e_f(t-k)$ is the foreground acoustic output signal, and $e_b(t-k)$ is the background acoustic output signal.

if $E_f(t) < \zeta E_b(t)$ \quad (14)

then load foreground coefficients into background filter.

if $E_b(t) < \zeta E_f(t)$ \quad (15)

then backload background coefficients into foreground filter, where $\zeta$ is a constant.

During detection of near-end speech, the power of the near-end speech signal changes quickly. The power of the noise component does not change quickly as compared to the near-end speech signal component. Therefore, the noise condition does not result in a sudden transition in power fluctuation as exhibited by the near-end speech signal. Since the sudden transitions of the near-end speech signal also cause too many decision swaps on the near-end speech, unstable outputs of acoustic echo canceler 10 may occur. Thus, near-end speech detection circuit 14 allows for a hangover period of several frames when the near-end speech is detected in order to reduce too many decision swaps between the near-end speech and no near-end speech conditions.

The hangover period implemented upon near-end speech detection is shown in an operational flow chart for acoustic echo canceler 10 at FIG. 3. Operational flow begins at a start block 80 where acoustic echo canceler 10 is initialized. The initialization of acoustic echo canceler 10 includes setting a hangover count to zero and installing default values for parameters used by acoustic echo canceler 10. Process flow proceeds along two paths corresponding to the two conditions used in determining the presence of near-end speech. Along the first path representing the first condition, acoustic echo canceler 10 receives s(t) far-end speech signal 28 at high pass filter 32 and also receives x(t) send-in signal 28 at high pass filter 36, as shown by block 82. After filtering is complete, process flow proceeds to power computation and ratio block 84 where s(t) far-end speech signal 20 and x(t) send-in signal 28 are averaged by far-end sampling circuit 34 and send-in sampling circuit 38 respectively. After averages $\bar{x}(t)$ and $\bar{s}(t)$ are obtained for each signal, divider circuit 40 generates a $\gamma(t)$ acoustic echo path gain/loss signal 42 that is sent to compare block 86 of the operational flow chart. Process flow proceeds to block 88 where $\gamma(t)$ acoustic echo path gain/loss signal 42 is subjected to a long term average determination. At compare block 86, the $\gamma(t)$ acoustic echo path gain/loss signal 42 is compared to the $\rho_\gamma$ long term average in order to interrogate the first condition indicating the presence of near end speech.

Along the second path representing the second condition, adaptive filter block 90 receives s(t) far-end speech signal 20 and x(t) send-in signal 18 at adaptive filter circuit 12. Adaptive filter circuit 12 generates e(t) acoustic echo canceler output signal 26. Process flow continues to power computation block 92 where an $\bar{e}(t)$ average power is determined for e(t) acoustic echo canceler output signal 26. The resulting $\bar{e}(t)$ average power is sent to compare block 86 for further processing. Process flow continues to long term average block 94 where the $\bar{e}(t)$ average power is processed into a $\rho_e$ long term power average of e(t) acoustic echo canceler output signal 26. Compare block 86 compares the $\bar{e}(t)$ average power of e(t) acoustic echo canceler output signal 26 to its $\rho_e$ long term power average in order to interrogate the second condition indicating the presence of near-end speech.

Process flow proceeds to decision block 96 where a determination is made as to whether both the first and second conditions are satisfied. If both conditions are satisfied, process flow proceeds to decision block 98 in order to determine the status of the hangover count. If the hangover count is at a zero value, as would be the case upon initial detection of near-end speech, process flow proceeds to block 100 where the hangover count is set to a selected interval value. For an acoustic echo canceler 10 having a dual path structure for adaptive filter 16, the coefficients of background filter 70 are backloaded to foreground filter 72. Process flow then proceeds back to the beginning of the near-end speech detection operation.

If the first and second conditions are no longer satisfied at decision block 96, process flow proceeds to decision block 102 where a check is made to determine whether the hangover count is greater than zero. If the hangover count is greater than zero, process flow proceeds to block 104 where the hangover count is decremented by a value of one. Process flow then continues to the beginning of the near-end speech detection operation. If the hangover count is equal to zero at decision block 102, process flow returns to the beginning of the near-end speech detection operation for single filter structures of adaptive filter 16.

For a dual path structure within adaptive filter 16, process flow continues to decision block 106 where a check is made to see if the power $E_f(t)$ out of foreground filter 72 is less than the power $E_b(t)$ out of background filter 70. If the foreground power $E_f(t)$ is less than the background power $E_b(t)$, process flow proceeds to block 108 where the coefficients of the foreground filter 72 are loaded into background filter 70. After loading, process flow returns to the beginning of the near-end speech detection operation. If the foreground power $E_f(t)$ is not less than the background power $E_b(t)$, process flow proceeds to decision block 110 where a check is made to see if the background power $E_b(t)$ is less than the foreground power $E_f(t)$. If such a case exists, process flow proceeds to block 112 where the coefficients of background filter 70 are loaded into foreground filter 72. After backloading, process flow returns to the beginning of the near-end speech detection operation. If the background power $E_b(t)$ is not less than the foreground power $E_f(t)$ at this stage, process flow returns to the beginning of the near-end speech detection operation without performing any loading or backloading to or from the foreground filter 72 and the background filter 70.

Figure 4:
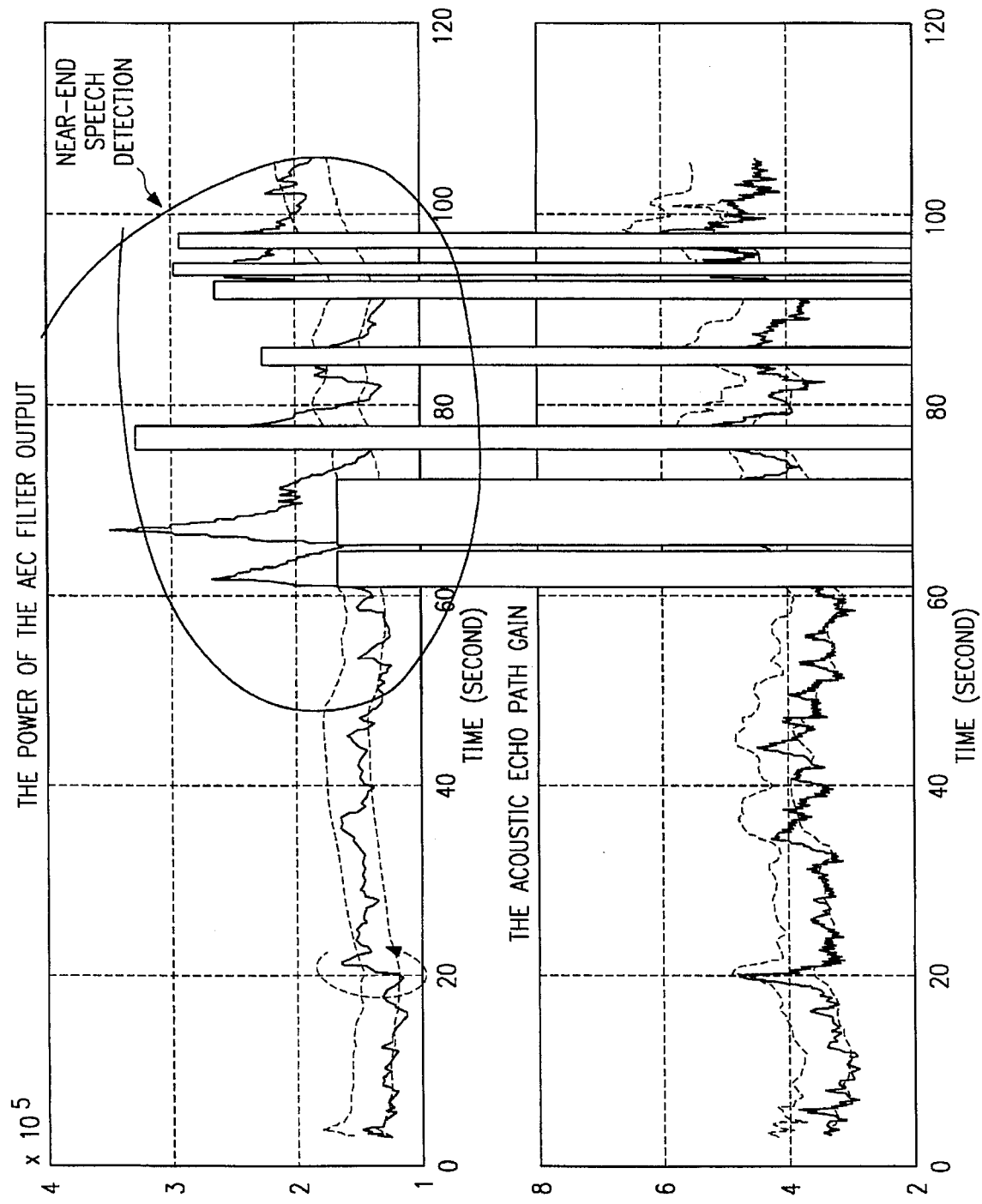
FIG. 4 illustrates a graph showing the detection of near-end speech.

FIG. 4 shows an example of the effectiveness of the near-end speech detection. The graph of FIG. 4 illustrates a speech file collected in an automobile during highway driving. Near-end speech detection is shown by shaded bars. The following values for parameters in the equations were used:

$$M = 128 \quad\quad P = 1$$
$$\gamma = 2^{-7} \quad\quad \mu = 2^{-10}$$
$$k_1 = k_2 = 1.25 \quad\quad \zeta = 1.14.$$

The equations for $\rho_e$ and $\rho_\gamma$ were modified to avoid long term averages that may be too big for subsequent near-end speech detection. The equations for $\rho_e$ and $\rho_\gamma$ are as follows, showing when and if updating is to be performed:

$$\begin{aligned}
\rho_e &= \rho_e & &\text{if near-end speech} & (16)\\
&= (1-\mu)\rho_e + \mu \bar{e}(t) & &\text{if } \bar{e}(t) > \rho_e \\
&= (1-4\mu)\rho_e + 4\mu \bar{e}(t) & &\text{if } \bar{e}(t) < \rho_e \\
\rho_\gamma &= \rho_\gamma & &\text{if near-end speech} & (17)\\
&= (1-\mu)\rho_\gamma + \mu\gamma(t) & &\text{if } \gamma(t) > \rho_\gamma \\
&= (1-4\mu)\rho_\gamma + 4\mu\gamma(t) & &\text{if } \gamma(t) < \rho_\gamma
\end{aligned}$$

Near-end speech detection occurs in noisy conditions having low signal to noise ratios.

In summary, an acoustic echo canceler includes a near-end speech detection circuit that determines the presence of near-end speech regardless of the operating environment of the acoustic echo canceler. The near-end speech detection circuit compares an acoustic echo path gain/loss signal with its long term average as a first condition and also compares the average power of an acoustic echo canceler output signal with its long term average as a second condition. For optimum near-end speech detection, both conditions must be satisfied. Both conditions are satisfied when the acoustic echo path gain/loss signal is greater than its long term average in the first condition and the average power of the acoustic echo canceler output signal is greater than its long term average in the second condition. The near-end detection circuit implements a hangover count to prevent unstable outputs of the acoustic echo canceler caused by frequent sudden transitions between the detection of near end speech and no near end speech.

Thus, it is apparent that there has been provided, in accordance with the present invention, a method and apparatus for detecting a near-end speech signal that satisfies the advantages set forth above. Although the preferred embodiment has been described in detail, it should be understood that various changes, substitutions, and alterations can be made herein. For example, different parameters and different comparisons of the far-end speech signal, send-in signal, and acoustic echo canceler output signal may be made while still providing for the detection of near-end speech. Other examples are readily ascertainable to one skilled in the art without departing from the spirit and scope of the present invention as defined by the following claims.

What is claimed is:

1. A method of detecting a near-end speech, comprising the steps of:
   determining an average power of an acoustic echo canceler output signal over a selected sampling period in response to a received send-in signal from a microphone and an adaptive filter output signal of an adaptive filter;
   filtering a far-end speech signal, the far-end speech signal generating the adaptive filter output signal;
   filtering the received send-in signal;
   determining an average of the filtered far-end speech signal over the selected sampling period;
   determining an average of the filtered received send-in signal over the selected sampling period;
   determining an acoustic echo path gain/loss, the acoustic echo path gain/loss being a ratio of the averaged filtered received send-in signal and the averaged filtered far-end speech signal;
   determining a long-term power average of the acoustic echo canceler output signal;
   determining a long term average of the acoustic echo path gain/loss;
   comparing the acoustic echo path gain/loss with the long term average of the acoustic echo path gain/loss; and
   comparing the average power of the acoustic echo canceler output signal with the long term power average of the acoustic echo canceler output signal in order to detect a presence of the near-end speech signal.

2. The method of claim 1, wherein the presence of near-end speech occurs when the average power of the acoustic echo canceler output signal and the acoustic echo path gain/loss are greater than selected multiples of the long-term power average of the acoustic echo canceler output signal and the long-term average of the acoustic echo path gain/loss, respectively.

3. The method of claim 1, further comprising the steps of:
   determining a foreground power output estimate of a foreground filter of the adaptive filter;
   determining a background power output estimate of a background filter of the adaptive filter;
   comparing the foreground power output estimate with the foreground power output estimate to determine appropriate coefficients for the background and foreground filters of the adaptive filter.

4. The method of claim 3, further comprising the step of:
   loading coefficients of the foreground filter into the background filter when the foreground power output estimate is greater than a multiple of the background power output estimate.

5. The method of claim 3, further comprising the step of:
   loading coefficients of the background filter into the foreground filter when the background power output estimate is greater than a multiple of the foreground power output estimate.

6. The method of claim 3, further comprising the steps of:
   establishing a hang over count upon detecting the presence of the near-end speech signal;

loading coefficients of the foreground filter into the background filter in response to establishing the hang over count.

7. The method of claim 1, further comprising the step of:

establishing a hang over count upon detecting the presence of the near-end speech signal.

8. The method of claim 7, further comprising the step of:

updating coefficients for the adaptive filter in response to establishing the hang over count.

9. The method of claim 7, further comprising the step of:

decrementing the hang over count upon an absence of the near-end speech signal.

10. The method of claim 9, further comprising the step of:

updating the long term power average of the acoustic echo canceler output signal and the long term average of the acoustic echo path gain/loss in response to the hang over count reaching a value of zero.

11. A near-end speech detection device for use in an acoustic echo canceler, comprising:

a first high pass filter operable to receive a far-end speech signal, said first high pass filter operable to remove low frequency components of said far-end speech signal;

a far-end sampling circuit operable to generate an average signal of said far-end speech signal over a selected sampling period;

a second high pass filter operable to receive a send-in signal, said send-in signal including a far-end speech component, a near-end speech component, and a noise component, said second high pass filter operable to remove low frequency components of said send-in signal;

a send-in sampling circuit operable to generate an average signal of said send-in signal over said selected sampling period;

a divider circuit operable to generate an acoustic echo path gain/loss signal, said acoustic echo path gain/loss signal being a ratio of said average signal of said send-in signal to said average signal of said far-end speech signal;

a long term echo path averaging circuit operable to generate a long term average signal of said acoustic echo path gain/loss signal;

a near-end detector operable to determine a first condition for a presence of near-end speech when said acoustic echo path gain/loss signal is greater than said long term average signal.

12. The near-end speech detection device of claim 11, further comprising:

a power sampling circuit operable to receive an acoustic echo canceler output signal, said power sampling circuit operable to generate an average signal of said acoustic echo canceler output signal over said selected sampling period;

a long term echo canceler averaging circuit operable to generate a long term power average signal in response to said average signal of said acoustic echo canceler output signal, said near-end detector operable to determine a second condition for said presence of near-end speech when said average signal of said acoustic echo canceler output signal is greater than said long term power average signal.

13. The near-end speech detection device of claim 12, wherein said near-end detector is operable to generate an indication signal when said first and second conditions are satisfied.

14. The near-end speech detection device of claim 12, wherein said long term average signal and said long term power average signal are updated upon an indication that no near-end speech has been detected.

15. The near-end speech detection device of claim 12, wherein said near-end detector includes a hangover counter, said hangover counter having a hangover count that is set to a selected value upon an initial presence of near-end speech, said hangover count preventing said near-end detector from processing sudden transitions in said presence of near-end speech.

16. The near-end speech detection device of claim 15, wherein said hangover count is reset to said selected value upon a subsequent presence of near-end speech following said hangover count reaching a value of zero.

17. The near-end speech detection device of claim 15, wherein said long term average signal and said long term power average signal are not updated upon said presence of near-end speech or when said hangover count has a value greater than zero.

18. A near-end speech detector, comprising:

(a) a far-end signal averager;

(b) a near-end signal averager;

(c) a divider with inputs coupled to said far-end signal averager and to said near-end signal averager;

(d) an echo-cancelled near-end signal averager;

(e) a comparator with inputs coupled to said divider and to said echo-cancelled near-end signal averager, said comparator comparing (i) an output of said divider with prior outputs of said divider and (ii) an output of said echo-cancelled near-end signal averager to prior outputs of said echo-cancelled near-end signal averager to indicating the presence or to indicated the absence of near-end speech in a near-end signal.

\* \* \* \* \*